United States Patent [19]

Sabotinov et al.

[11] Patent Number: 4,782,493
[45] Date of Patent: Nov. 1, 1988

[54] GAS DISCHARGE TUBE WITH HOLLOW CATHODE FOR METAL VAPOR LASER

[75] Inventors: Nikola V. Sabotinov; Margarita G. Grozeva; Ivan R. Angelov, all of Sofia, Bulgaria

[73] Assignee: Institute PO Phisica Na Tvardoto Tyalo, Sofia, Bulgaria

[21] Appl. No.: 91,808

[22] Filed: Sep. 1, 1987

[51] Int. Cl.⁴ .............................................. H01S 3/097
[52] U.S. Cl. ...................................... 372/88; 372/61; 372/103; 372/56
[58] Field of Search ..................... 372/87, 88, 103, 56, 372/66, 55, 61

[56] References Cited

U.S. PATENT DOCUMENTS 3,887,883  6/1975  Garman ............................... 372/66
4,689,798  8/1987  Fox et al. ............................ 372/87

Primary Examiner—Léon Scott, Jr.
Attorney, Agent, or Firm—Klein & Vibber

[57] ABSTRACT

This invention relates to a gas discharge hollow cathode tube for laser using metal vapors having a vacuum compact housing where an anode and a hollow spiral cathode are mounted connected to a source of excitation, the hollow cathode contains an active metal medium, having evenly distributed apertures on the pipe's upper inner part, and resistance wire fitted inside the hollow cathode supplied from an electric source. This apparatus avoids the disadvantages of a similar gas discharge tube having metal in the cylindrical cathode where the metal vapors enter the discharge zone uncontrollably, causing metal accumulation in some zones which thus partially covers the laser tube aperture, and because the high-level ionic metal laser levels are not efficiently excited as it operates under low voltages, it cannot be used for generation using easily fusable metals as the spiral cathode cannot be made of such metals. The invention also has improved stability and efficacy of the generation.

3 Claims, 1 Drawing Sheet

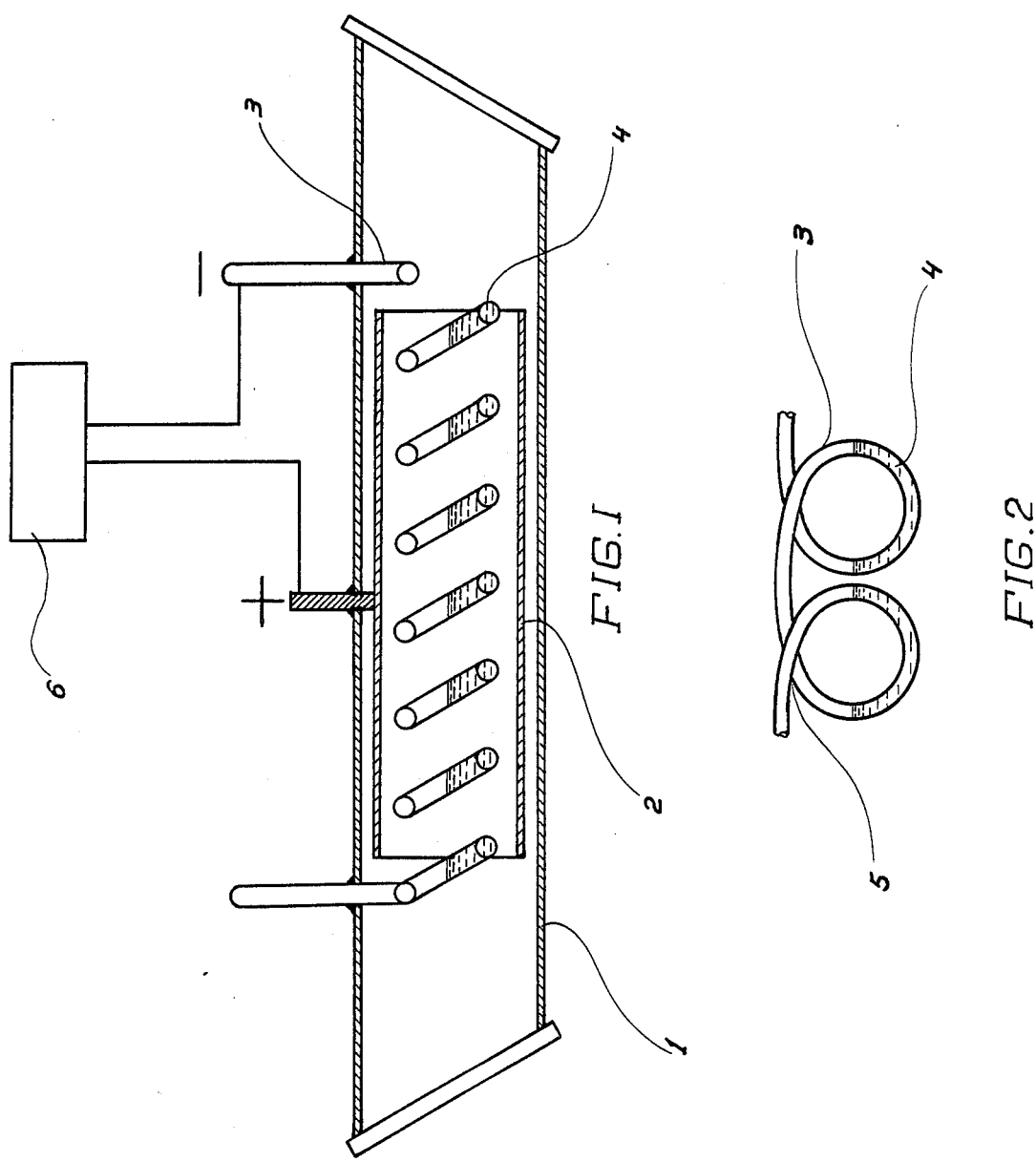

GAS DISCHARGE TUBE WITH HOLLOW CATHODE FOR METAL VAPOR LASER

FIELD OF THE INVENTION

This invention relates to a gas discharge tube with a hollow cathode for laser with metal vapors which shall find application in the field of holography, measuring instrumentation, medicine, scientific research and spectroscopy for the realization of laser generation of metal vapors of easily fusable metals (zinc, cadmium, selenium, Tellurium, iodine), halides, which evaporate at low temperatures, as well as of metals in liquid phase in room temperatures (mercury).

DESCRIPTION OF THE PRIOR ART

There is a well-known gas discharge tube with hollow cathode for lasers with metal vapors consisting of a vacuum sealed housing where an anode and a hollow cylindrical cathode connected to a source of excitation are fitted. Metal for active laser medium is placed inside the cylindrical cathode and it is heated by the gas discharge, evaporated and enters the discharge zone of the cylindrical hollow cathode.

It is a disadvantage of the gas discharge hollow cathode laser tube with a cylindrical cathode in which metal is placed that it has an unstable generation and this is due to the fact that the metal vapors enter uncontrollably in the discharge zone. Metal accumulation is observed in certain zones and partially covers the laser tube aperture. Another disadvantage of the hollow cylindrical cathode is that it operates under low voltages where the high-located ionic metal laser levels are not effectively excited.

There is a well-known gas discharge laser tube having a spiral hollow cathode for lasers with metal vapors. It is mainly used for lasers with vapors; the atoms of which are produced as a result of cathode sputtering of the metal of which the spiral is made under the conditions of the gas discharge. The hollow spiral cathode operates at high voltages which enables the more effective excitation of the laser levels. The stability of its generation is better than that of the laser with hollow cylindrical cathode.

It is a disadvantage of the gas discharge laser tube with hollow spiral cathode that it cannot be used for generation with easily fusable metals of which it is impossible to make the spiral cathode. The placing of the metal inside the hollow spiral cathode is also impossible as is the case with the hollow cylindrical cathode as the metal runs out through the spiral clearance (gap). The usual practice is to insert the metal vapors into the cathode discharge zone from the outside and for this reason no sufficiently high metal concentration can be produced inside the cathode because the hot discharge zone pushes out the metal vapors and impedes their penetration into the discharge zone, and in case of high densities of the discharge current, as a result of electrophoretic, cataphoretic and other similar effects, the metal vapors are pushed out of the hollow of the spiral hollow cathode.

OBJECT OF THE INVENTION

It is an object of the present invention to make a gas discharge tube with hollow cathode for laser with metal vapors having improved stability and effectiveness of the generation.

This object is solved by means of a gas discharge tube with hollow cathode for laser with metal vapors consisting of a vacuum compact housing where an anode and a hollow spiral cathode are fitted and connected to a source of excitation. The hollow spiral cathode is fabricated of a metal tube which is not easily fused (melted) in which an easily fusable metal is fitted. Apertures are made along the spiral's length on its upper internal part.

Resistance wire connected to a supply source is fitted for additional heating of the easily fusable metal along the length of the tube of which the hollow spiral cathode is made.

The advantages of the gas discharge tube having a hollow cathode for metal vapor laser, according to this invention, are the greater efficiency and improved stability of the generation due to the homogenous vapor concentration of the easily fusable metal in the discharge zone.

This invention can be better explained by means of a model implementation shown in the attached figures.

BRIEF DESCRIPTION OF THE DRAWINGS

FIG. 1 is the longitudinal section of the gas discharge tube, and

FIG. 2 is an axonometric view of two windings of the spiral cathode.

DETAILED DESCRIPTION OF THE INVENTION

The hollow cathode gas discharge tube for metal vapors laser consists of a vacuum compact housing 1 where anode 2 and hollow spiral cathode 3 are fitted. The hollow spiral cathode 3 is made of difficult to fuse material, such a kovar. An easy-to-fuse metal, such as cadium is fitted inside the kovar tube as metal medium 4. The metal fills about half of the space of the hollow spiral cathode 3. apertures 5 are made evenly along the upper spiral part of a hollow cathode 3, on its internal side. The discharge tube is filled in by helium.

The sizes of apertures 5 and their arrangement depend on the discharge conditions and the type of the metal medium 4 used. The type of the metal medium 4 used also determines the pitch of the hollow spiral cathode 3.

The gas discharge tube having a hollow laser cathode with metal vapors operates as follows:

Voltage from the source of excitation 6 is supplied between the anode 2 and the hollow spiral cathode 3 as a result of which the discharge fills the space inside the hollow spiral cathode 3. As a result of the ionic bombardment cathode 3 is heated. The heating temperature depends of the electric power driven into the charge. As a result of cathode 3 heating, the metal medium, cadmium 4, begins to evaporate. Across apertures 5 it continuously enters the discharge zone. As the apertures 5 are evenly arranged along the length of the hollow spiral cathode 3, homogenous cadmium vapors concentration is established in the discharge zone of the hollow spiral cathode 3. Conditions for laser generation occur in the produced helium-cadmium mixture. The cadmium vapors leaving the discharge zone condensate on the cold sectors of the housing 1 and do not take part in the laser generation, nor do they obstruct it.

Although the invention is described and illustrated with reference to a preffered embodiments thereof, it is to be expressly understood that it is in no way limited to the disclosure of such preferred embodiment but is capable of numerous modifications within the scope of the appended claims.

We claim:

1. In a gas discharge tube of a hollow cathode laser having a vacuum compact housing a medium where an anode and the hollow cathode are connectable to a source of excitation voltage, the improvement comprising said hollow cathode comprising a metal tube wound as a spiral within which metal tube a metal medium is disposed, said metal tube being provided with apertures in portions of said tube along an inner upper part of the spiral cathode, whereby upon excitation, said metal medium interacts with said lasing medium to produce conditions for laser generation.

2. In a gas discharge tube for a hollow cathode laser as claimed in claim 1, the improvement further comprising said apertures being equally spaced.

3. In a gas discharge tube for a hollow cathode laser as claimed in claim 1, the improvement further comprising said metal tube being made of Kovar

* * * * *